United States Patent
Gopalan (10) Patent No.: US 9,756,370 B2
(45) Date of Patent: Sep. 5, 2017

(54) PREDICTING CONTENT POPULARITY

(71) Applicant: AT&T INTELLECTUAL PROPERTY I, L.P., Atlanta, GA (US)

(72) Inventor: Raghuraman Gopalan, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 135 days.

(21) Appl. No.: 14/727,717

(22) Filed: Jun. 1, 2015

(65) Prior Publication Data
US 2016/0353144 A1    Dec. 1, 2016

(51) Int. Cl.
| | |
|---|---|
| *G06K 9/54* | (2006.01) |
| *G06K 9/60* | (2006.01) |
| *H04N 21/25* | (2011.01) |
| *H04L 29/08* | (2006.01) |
| *H04N 21/466* | (2011.01) |
| *H04N 21/258* | (2011.01) |

(Continued)

(52) U.S. Cl.
CPC ....... *H04N 21/252* (2013.01); *H04L 67/1095* (2013.01); *H04L 67/18* (2013.01); *H04N 21/23103* (2013.01); *H04N 21/23418* (2013.01); *H04N 21/25891* (2013.01); *H04N 21/4532* (2013.01); *H04N 21/4667* (2013.01)

(58) Field of Classification Search
CPC ....... H04N 21/23013; H04N 21/23418; H04N 21/252; H04N 21/25891; H04N 21/4532; H04N 21/4667; H04L 67/18; H04L 67/1095

USPC ......................................................... 382/305
See application file for complete search history.

(56) References Cited

U.S. PATENT DOCUMENTS 7,639,386 B1 * 12/2009 Siegel .................... G06Q 10/10
                                                       358/1.18
7,974,868 B2    7/2011 Tseng et al.
(Continued)

FOREIGN PATENT DOCUMENTS

WO    2010127150 A2    11/2010
WO    2011139643 A1    11/2011
(Continued)

OTHER PUBLICATIONS

"New tool predicts which trends will go viral on Twitter," Press Trust of India, gadgets.ndtv.com, Apr. 29, 2014. http://gadgets.ndtv.com/social-networking/news/new-tool-predicts-which-trends-will-go-viral-on-twitter-515884, 2 pages.
(Continued)

Primary Examiner — Kanjibhai Patel
(74) Attorney, Agent, or Firm — Toler Law Group, PC (57) ABSTRACT

A method includes receiving media data corresponding to a media content item. The method further includes analyzing the media data to determine characteristics of the media content item based on first visual information contained in the media content item. The method further includes analyzing the characteristics of the media content item based on a media popularity model to generate a prediction of whether the media content item is likely to exceed a popularity threshold within a particular period of time. The method further includes determining, at the computing device, a network location at which to store the media content item based on the prediction.

20 Claims, 6 Drawing Sheets

(51) Int. Cl.
*H04N 21/45* (2011.01)
*H04N 21/234* (2011.01)
*H04N 21/231* (2011.01)

(56) References Cited

U.S. PATENT DOCUMENTS

| | | | |
|---|---|---|---|
| 8,140,376 B2 | 3/2012 | Koonce et al. | |
| 8,196,166 B2* | 6/2012 | Roberts | G06Q 30/00 |
| | | | 725/32 |
| 8,332,512 B1 | 12/2012 | Wu et al. | |
| 8,429,011 B2 | 4/2013 | Newton et al. | |
| 8,521,679 B2 | 8/2013 | Churchill et al. | |
| 8,806,000 B1 | 8/2014 | Wattenhofer et al. | |
| 8,924,270 B2* | 12/2014 | Tran | G06Q 20/10 |
| | | | 705/35 |
| 9,199,165 B2* | 12/2015 | Zahn | H04N 21/4781 |
| 9,380,013 B1* | 6/2016 | Cashmore | H04L 51/10 |
| 9,503,500 B2* | 11/2016 | Rahbar | G06F 17/30038 |
| 2008/0256233 A1 | 10/2008 | Hall et al. | |
| 2009/0192871 A1 | 7/2009 | Deacon et al. | |
| 2010/0217720 A1 | 8/2010 | Jones et al. | |
| 2011/0217022 A1 | 9/2011 | Miller et al. | |
| 2011/0302103 A1 | 12/2011 | Carmel et al. | |
| 2012/0203623 A1 | 8/2012 | Sethi et al. | |
| 2012/0239489 A1 | 9/2012 | Peretti et al. | |
| 2013/0151333 A1 | 6/2013 | el Kaliouby et al. | |
| 2013/0346330 A1 | 12/2013 | Fleischman et al. | |
| 2014/0195296 A1 | 7/2014 | Smyth | |
| 2014/0237093 A1 | 8/2014 | Hofman et al. | |
| 2014/0279068 A1 | 9/2014 | Systrom et al. | |
| 2014/0363143 A1 | 12/2014 | Dharssi et al. | |

FOREIGN PATENT DOCUMENTS

| | | |
|---|---|---|
| WO | 2013064505 A1 | 5/2013 |
| WO | 2014159540 A1 | 10/2014 |

OTHER PUBLICATIONS

Abate, T., "Computer Scientists Learn to Predict which Photos will 'Go Viral' on Facebook," engineering.stanford.edu, Apr. 3, 2014, http://engineering.stanford.edu/news/computer-scientists-learn-predict-which-photos-will-go-viral-facebook, 2 pages.

Berger, J. et al., "What Makes Online Content Viral," Abstract only, Journal of Marketing Research, Apr. 2012, vol. 49, No. 2, pp. 192-205.

Berger, J., "How to Make Your Content Go Viral," Jonah's Blog, jonahberger.com, http://jonahberger.com/how-to-make-your-content-go-viral/, Retrieved on Feb. 27, 2015, 2 pages.

Bliss, L., "The Social Science Behind Online Shareablity," www.citylab.com, Feb. 20, 2015, http://www.citylab.com/tech/2015/02/the-social-science-behind-online-shareablity/385514/, 4 pages.

Brown, M., "Can I Make My Ad Go Viral?," millwardbrown.com, copyrighted © 2011; http://www.millwardbrown.com/docs/default-source/insight-documents/knowledge- points/MillwardBrown_KnowledgePoint_AdViral.pdf, 4 pages.

Dormehl, L., "These Researchers Say They Can Predict Which Tweets Will Go Viral," fastcompany.com; http://www.fastcompany.com/3042372/fast-feed/these-researchers-say-they-can-predict-which-tweets-will-go-viral, Feb. 12, 2015, 2 pages.

Jain, P. et al., "Scalable Social Analytics for Live Viral Event Prediction," synrg.csi.illinois.edu, Duke University, IMB T. J. Watson Research, UIUC. http://synrg.csl.illinois.edu/papers/crowdcast_icwsm.pdf, In Eighth International AAAI Conference on Web, 10 pages.

Shamma, D., et al., "Viral Actions: Predicting Video View Counts Using Synchronous Sharing Behaviors," judeyew.net, U of Michigan, Yahoo!, http://judeyew.net/VitaePapers/ShammaYewKennedyChurchill-ICWSM2011.pdf, In ICWSM, 2011, 4 pages.

Sprung, S., "This Incredible Chart Predicts Which Articles Will Go Viral," Business Insider, thebusinessinsider.com, May 18, 2012 http://www.businessinsider.com/what-makes-an-article-go-viral-2012-5, 2 pages.

Wasserman, T., "New Tool Promises to Predict Whether Your Video Will Go Viral," Mashable, mashable.com, Jan. 29, 2013, http://mashable.com/2013/01/29/new-tool-viral-videos/, 2 pages.

Wu, R., "Will You Go Viral? Here's a Way to Predict," forbes.com, Jan. 3, 2014, http://www.forbes.com/sites/groupthink/2014/01/03/will-you-go-viral-heres-a-way-to-predict/, 5 pages.

* cited by examiner

PREDICTING CONTENT POPULARITY

FIELD OF THE DISCLOSURE

The present disclosure is generally related to predicting content popularity.

BACKGROUND

The Internet enables media to be communicated to large numbers of people quickly. In particular, various Internet-based platforms may be used to distribute and access media content items, such as videos. "Viral" videos are videos that are viewed by a large number of people in a relatively short period of time. Viral videos may be useful for a variety of applications including advertising, generating traffic to a site, disseminating political views, etc., but it may be difficult for producers and/or distributers of videos to predict which videos will "go viral."

DETAILED DESCRIPTION

A computing device may be used to predict whether a media content item (e.g., a video) will "go viral." Going viral may correspond to exceeding a popularity threshold within a particular period of time. For example, a media content item may be considered to have gone viral when the media content item has been accessed or viewed at least ten thousand times within two months. The computing device may make a prediction as to whether the media content item will go viral by comparing visual features (e.g., spatio-temporal features) extracted from the media content item to a decision boundary. The decision boundary may be based on sample datasets of videos classified as viral and videos classified as non-viral. The computing device may determine where in a network the media content item should be stored based on the prediction. For example, videos that are viral may be accessed many times so the computing device may store predicted viral videos in relatively more locations, as compared to predicted non-viral videos, to spread demand on system resources amongst multiple network components. When the computing device predicts that the media content item will not go viral, the computing device may generate suggested content changes that may increase a likelihood of the media content item going viral.

Therefore, the computing device may improve the functioning of a network by predicting what media content items will be viral and storing the media content items accordingly (e.g., by storing predicted viral media content items in a relatively more distributed fashion). In addition, the computer may recommend content changes to increase the likelihood that a media content item will go viral.

In a particular embodiment, a method includes receiving, at a computing device, media data corresponding to a media content item. The method further includes analyzing, at the computing device, the media data to determine characteristics of the media content item based on first visual information contained in the media content item. The method further includes analyzing, at the computing device, the characteristics of the media content item based on a media popularity model to generate a prediction of whether the media content item is likely to exceed a popularity threshold within a particular period of time. The method further includes determining, at the computing device, a network location at which to store the media content item based on the prediction.

In another particular embodiment a computer-readable storage device stores instructions that, when executed by a processor, cause the processor to perform operations. The operations include receiving media data corresponding to a media content item. The operations further include analyzing the media data to determine characteristics of the media content item based on first visual information contained in the media content item. The operations further include analyzing the characteristics of the media content item based on a media popularity model to generate a prediction of whether the media content item is likely to exceed a popularity threshold within a particular period of time.

In another particular embodiment an apparatus includes a processor and a memory. The memory stores instructions that, when executed by the processor, cause the processor to perform operations. The operations include receiving media data corresponding to a media content item. The operations further include analyzing the media data to determine characteristics of the media content item based on first visual information contained in the media content item. The operations further include analyzing the characteristics of the media content item based on a media popularity model to generate a prediction of whether the media content item is likely to exceed a popularity threshold within a particular period of time. The operations further include determining a network location at which to store the media content item based on the prediction. The operations further include generating a suggested content change in response to determining that the media content item is not likely to exceed the popularity threshold.

Figure 1:
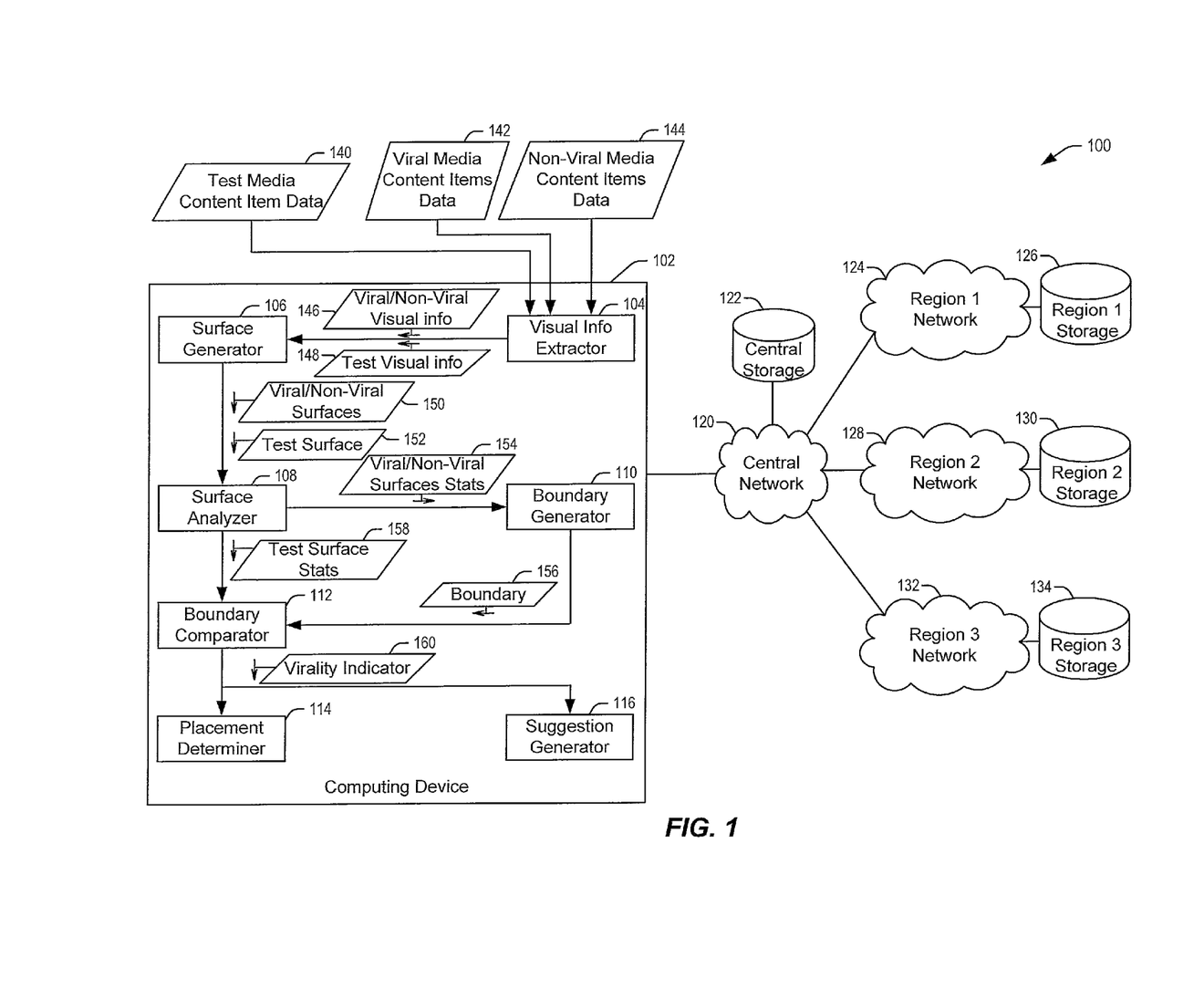
FIG. 1 is a diagram of a particular illustrative embodiment of a system that predicts content popularity.

Referring to FIG. 1 a diagram illustrating an embodiment of a system 100 for predicting content popularity is shown. The system 100 includes a computing device 102. The computing device 102 includes a visual information extractor 104, a surface generator 106, a surface analyzer 108, a boundary generator 110, a boundary comparator 112, a placement determiner 114, and a suggestion generator 116. The components 104, 106, 108, 110, 112, 114, 116 of the computing device 102 may be implemented by hardware, by software executing at a processor of the computing device 102, or by a combination thereof.

The computing device 102 may be coupled to a central network 120. The central network 120 may be configured to distribute content to different regional networks including a region 1 network 124, a region 2 network 128, and a region 3 network 132. Each of the regional networks 124, 128, 132 may provide content to various devices. In particular examples, each of the regional networks 124, 126, 132 is associated with a different geographic, national, or cultural region. To illustrate, the region 1 network 124 may provide service to devices in the United Kingdom and the region 2 network 128 may provide service to devices in the United States. Demand for particular types of media content items may vary across regions. For example, videos related to the sport cricket may be more popular in the United Kingdom than in the United States.

The central network 120 may be coupled to a central storage device 122. The region 1 network 124 may be coupled to a region 1 storage device 126. The region 2 network 128 may be coupled to a region 2 storage device 130. The region 3 network 132 may be coupled to a region 3 storage device 134. Each of the storage devices 122, 126, 130, 134 may be configured to store media content items that may be requested by devices serviced by the regional networks 126, 130, 134. The storage devices 122, 126, 130, 134 are representative and could include more than one physical device. For example, one or more of the storage devices 122, 126, 130, 134 may correspond to a storage system. The central storage device 122 may be configured to receive requests for media content items from devices associated with the central network 120, the region 1 network 124, the region 2 network 128, the region 3 network 132, or a combination thereof. In response to the requests, the central storage device 122 may send the requested media content items to the devices. The region 1 storage device 126 may be configured to receive requests for media content items from devices associated with the region 1 network 124 and may send the requested media content items to the devices. The region 2 storage device 130 may be configured to receive requests for media content items from devices associated with the region 2 network 128 and may send the requested media content items to the devices. The region 3 storage device 134 may be configured to receive requests for media content items from devices associated with the region 3 network 132 and may send the requested media content items to the devices.

In operation, the computing device 102 may receive viral and non-viral media content training data. The viral media content training data may include data associated with a first set of media content items that have exceeded (or been classified as having exceeded) a popularity threshold (e.g., that have "gone viral"). The non-viral media content training data may include data associated with a second set of media content items that have not exceeded (or been classified as not having exceeded) the popularity threshold. The computing device 102 may construct a media popularity model based on visual information contained in the viral and non-viral media content training data. The visual information may correspond to characteristics of frames of the viral and non-viral media content training data across time. The computing device 102 may then receive test media content items. The computing device 102 may predict whether the test media content items will go viral. The computing device 102 may compare the test media content items to the media popularity model to determine whether the test media content items are likely to go viral (e.g., to exceed a popularity threshold within a particular period of time) and make one or more decisions based on the determination.

In the illustrated example, the visual information extractor 104 receives viral media content items data 142 (e.g., viral media content training data) and non-viral media content items data 144 (e.g., non-viral media content training data). The viral media content items data 142 may correspond to or include a first set of media content items (e.g., videos) that have been pre-classified (e.g., by a human or by a computer) as being "viral." A media content item may be classified as viral when the media content item has satisfied a popularity threshold (e.g., a number of views) within a particular period of time. For example, videos that have been viewed 10,000 or more times within 2 months may be classified as viral. The non-viral media content items data 144 may correspond to or include a second set of media content items that have been pre-classified as being "non-viral." A media content item may be classified as non-viral when the media content item has not satisfied the popularity threshold within the particular period of time. The popularity threshold and/or the particular period of time may be different values in other examples and may be set by the human or the computer that preclassifies the viral media content items data 142 and the non-viral media content items data 144.

The visual information extractor 104 may be configured to extract visual information from (e.g., determine characteristics of) media content items. The visual information may include spatio-temporal features. To illustrate, a media content item may correspond to a video including a plurality of frames. The visual information extractor 104 may extract spatial features, such as a bag-of-visual words, a histogram of oriented gradients/optical flow, features detected using extended speeded up robust features (SURF), objects depicted in the media content item, features detected using other image processing techniques, or a combination thereof, for each frame of the media content item. The spatial features may include or correspond to pixel characteristics, detected edges, detected objects, detected features, detected blobs, other detected visual characteristics, or a combination thereof. Thus, the visual information extractor 104 may gather visual information including spatial information of a media content item across time (e.g., spatio-temporal features of the media content item). The visual information extractor 104 may extract visual information from each media content item of the viral media content items data 142 and from each media content item of the non-viral media content items data 144 to generate viral/non-viral visual information 146. The visual information extractor 104 may send the viral/non-viral visual information 146 to the surface generator 106.

The surface generator 106 may be configured to receive visual information from the visual information extractor 104 and to generate surfaces or curves based on the visual information. For example, each visual feature extracted by the visual information extractor 104 may correspond to a dimension of a surface generated by the surface generator 106 and time (e.g., frame numbers) may correspond to another dimension of the surface. Therefore, the surface generated by the surface generator 106 may be a multidimensional surface that models how visual information extracted from a media content item changes across time. The surface may correspond to a Riemannian shape space that is a non-linear manifold.

In the illustrated example, the visual information received by the surface generator 106 includes the viral/non-viral visual information 146 and the surfaces generated by the surface generator 106 may include viral/non-viral surfaces (e.g., manifolds) 150. The viral/non-viral surfaces 150 may include a surface for each media content item of the viral media content items data 142 and a surface for each media content item of the non-viral media content items data 144. Alternatively, the viral/non-viral surfaces 150 may include an average viral surface (e.g., a first manifold) and an average non-viral surface (e.g., a second manifold). The viral/non-viral surfaces 150 may be curves or surfaces in a multidimensional space. One axis of the multidimensional space may correspond to time and additional axes of the multidimensional space may correspond to the different visual features (e.g., characteristics) extracted by the visual information extractor 104 and included in the viral/non-viral visual information 146. In some examples, the surface generator 106 may normalize the viral/non-viral surfaces 150. For example, the surface generator 106 may apply one or more normalizing functions to the viral/non-viral surfaces 150 to account for variability of depictions of objects across media content items caused by translation, rotation, and scaling (e.g., objects may appear different in different media content items because the objects may be in different locations relative to cameras that create the media content items). Furthermore, the surface generator 106 may apply a normalizing function to the viral/non-viral surfaces 150 to adjust for temporal discontinuities (e.g., differences in media content items caused by the media content items encompassing different time periods). The surface generator 106 may send the viral/non-viral surfaces 150 to the surface analyzer 108.

The surface analyzer 108 may analyze data describing surfaces using Riemannian geometric concepts, such as geodesics to compute distances and tangent space approximations to compute similarity and statistical measures. In the illustrated example, the data analyzed by the surface analyzer 108 may include the viral/non-viral surfaces 150. For example, the surface analyzer 108 may generate viral/non-viral surfaces statistics 154. The viral/non-viral surfaces statistics 154 may include a tangent space approximation of each surface of the viral/non-viral surfaces 150. The surface analyzer 108 may send the viral/non-viral surfaces statistics 154 to the boundary generator 110.

The boundary generator 110 may be configured to determine boundaries between sets of data. For example, the boundary generator 110 may determine a decision boundary (e.g., a media popularity model) 156 between viral videos and non-viral videos based on the viral/non-viral surfaces statistics 154. Alternatively, the boundary generator 110 may generate the decision boundary 156 based on the viral/non-viral visual information 146 or based on the viral/non-viral surfaces 150. For example, the decision boundary 156 may be a hypersurface that divides a multidimensional space between media content items classified as viral and media content items classified as non-viral. One axis of the multidimensional space may correspond to time and additional axes of the multidimensional space may correspond to the different visual features (e.g., characteristics) extracted by the visual information extractor 104 and included in the viral/non-viral visual information 146. The boundary generator 110 may send data describing the decision boundary 156 to the boundary comparator 112. The decision boundary 156 is illustrated in FIG. 2.

Figure 2:
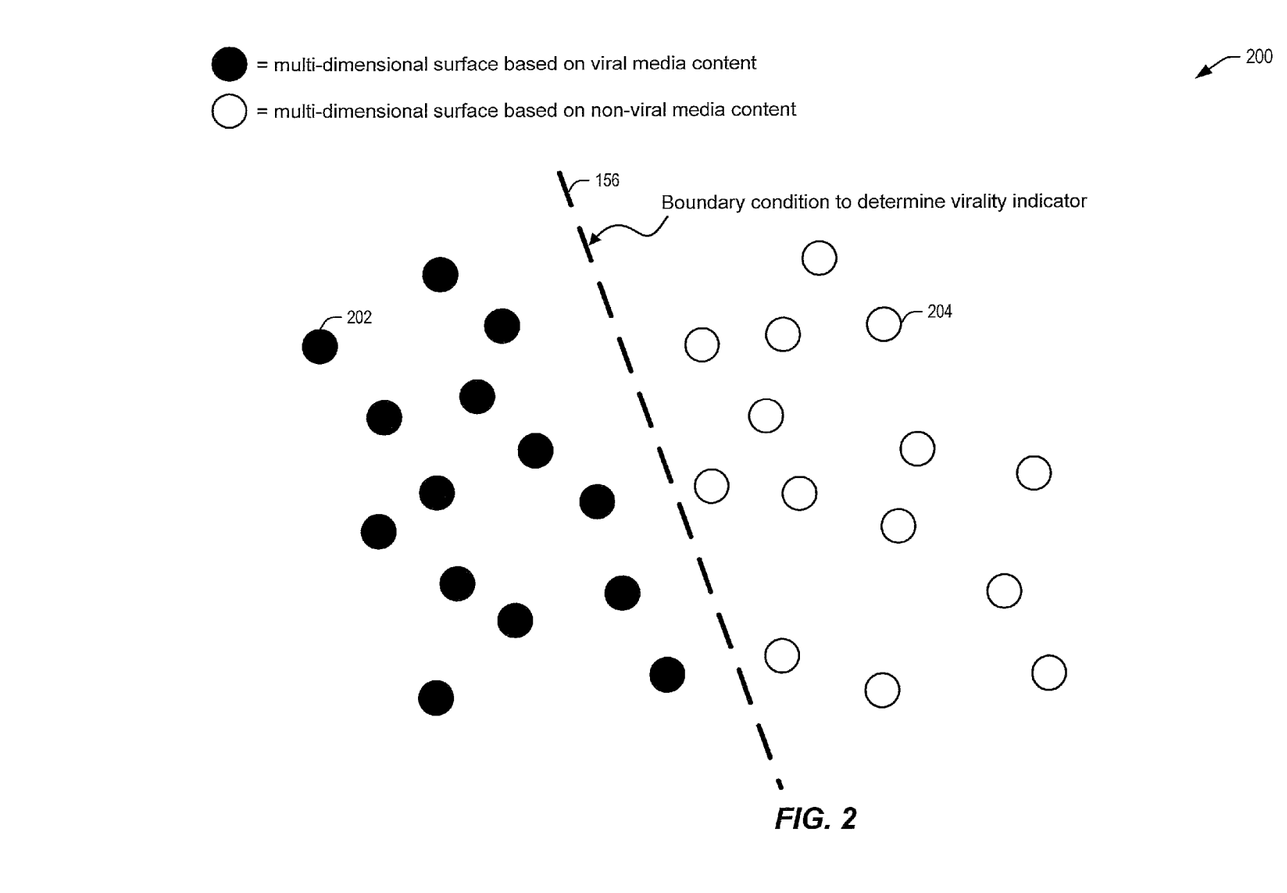
FIG. 2 is a diagram illustrating determining a boundary condition to predict content popularity.

FIG. 2 shows a diagram 200 illustrating the decision boundary 156. While shown as a line in a two dimensional plane, the decision boundary may correspond to a hyperplane in multidimensional space. The diagram 200 illustrates a first collection of data points 202 and a second collection of data points 204. While shown as points, each of the data points in the collections of data points 202, 204 may correspond to surfaces in a multidimensional space. The first collection of data points 202 may correspond to viral surfaces included in the viral/non-viral surfaces 150 or to tangent space approximations of the viral surfaces included in the viral/non-viral surfaces statistics 154. The second collection of data points 202 may correspond to non-viral surfaces included in the viral/non-viral surfaces 150 or to tangent space approximations of the non-viral surfaces. The boundary generator 110 may generate the decision boundary 156 to separate the first collection of data points 202 from the second collection of data points 204.

Returning to FIG. 1, the computing device 102 may use the decision boundary 156 to predict whether received test media content item data, such as test media content item data 140, will go viral (e.g., exceed the popularity threshold within the particular period of time). The test media content item data 140 may correspond to a media content item that has been uploaded to a content delivery system, such as the system 100. The computing device 102 may make decisions based on whether the test media content item data 140 is predicted to go viral. For example, the computing device 102 may determine where the test media content item data 140 is to be stored based on the prediction and/or may make suggested content changes based on the prediction.

The visual information extractor 104 may receive the test media content item data 140 and extract test visual information 148 from the test media content item data 140. The test visual information 148 may describe the same visual features over time in the test media content item data 140 that the viral/non-viral visual information 146 describes in the viral media content items data 142 and the non-viral media content items data 144. The visual information 146 may include spatio-temporal features. To illustrate, the test media content item data 140 may correspond to a video including a plurality of frames. The visual information extractor 104 may extract spatial features, such as a bag-of-visual words, a histogram of oriented gradients/optical flow, features detected using extended speeded up robust features (SURF), objects depicted in the test media content item data 140, features detected using other image processing techniques, or a combination thereof, for each frame of the media content item. The spatial features may include or correspond to pixel characteristics, detected edges, detected objects, detected features, detected blobs, other detected visual characteristics, or a combination thereof. Thus, the visual information extractor 104 may gather visual information including spatial information of the test media content item data 140 across time (e.g., spatio-temporal features of the media content item). The visual information extractor 104 may send the test visual information 148 to the surface generator 106.

The surface generator 106 may generate a test surface (e.g., a manifold) 152 based on the test visual information 148. The test surface 152 may be a curve or surface in the same multidimensional space as the viral/non-viral surfaces 150. One axis of the multidimensional space may correspond to time and additional axes of the multidimensional space may correspond to the different visual features (e.g., characteristics) extracted by the visual information extractor 104 and included in the test visual information 148. In some examples, the surface generator 106 may normalize the test surface 152. For example, the surface generator 106 may apply one or more normalizing functions to the test surface 152 to account for variability of depictions of objects across media content items (e.g., between the test media content item data 140, the viral media content items data 142, and the non-viral media content items data 144) caused by translation, rotation, and scaling (e.g., objects may appear different in different media content items because the objects may be in different locations relative to cameras that create the media content items). Furthermore, the surface generator 106 may apply a normalizing function to the test surface 152 to adjust for temporal discontinuities (e.g., differences in media content items caused by the media content items encompassing different time periods). The surface generator

106 may send the test surface 152 (or data describing the test surface 152) to the surface analyzer 108.

The surface analyzer 108 may generate test surface statistics 158 using a tangent space approximation of the test surface 152 to compute similarity and statistical measures and geodesics to measure distances on the test surface 152. The surface analyzer 108 may send the test surface statistics 158 (or data describing the test surface statistics 158) to the boundary comparator 112.

The boundary comparator 112 may be configured to determine whether a media content item is likely to "go viral" (e.g., exceed a popularity threshold within a particular period of time) by comparing statistics (e.g., a tangent space approximation) received from the surface analyzer 108 to a decision boundary received from the boundary generator 110. For example, the boundary comparator 112 may compare the test surface statistics 158 to the decision boundary 156 and generate the virality indicator 160 based on the comparison. To illustrate, the boundary comparator 112 may compare the test surface 152 or the tangent space approximation of the test surface 152 included in the test surface stats 158 to the decision boundary 156. When the test surface 152 or the tangent space approximation is located on a viral side of the decision boundary 156, the virality indicator 160 may indicate that the test media content item data 140 is likely to go viral. When the test surface 152 or the tangent space approximation is located on a non-viral side of the decision boundary 156, the virality indicator 160 may indicate that the test media content item data 140 is not likely to go viral. When the test surface 152 or the tangent space approximation is located on both sides of the decision boundary 156, the boundary comparator 112 may determine that the test media content item data 140 is not likely to go viral. Alternatively, the boundary comparator 112 may determine a percentage of the tangent space approximation or the test surface 152 that is on the viral side of the decision boundary 156. When the percentage is greater than a threshold (e.g., 50%), the boundary comparator 112 may determine that the test media content item data 140 is likely to go viral, and when the percentage is not greater than the threshold, the boundary comparator 112 may determine that the test media content item data 140 is not likely to go viral. The boundary comparator 112 may send the virality indicator 160 to the placement determiner 114 and to the suggestion generator 116.

Figure 3:
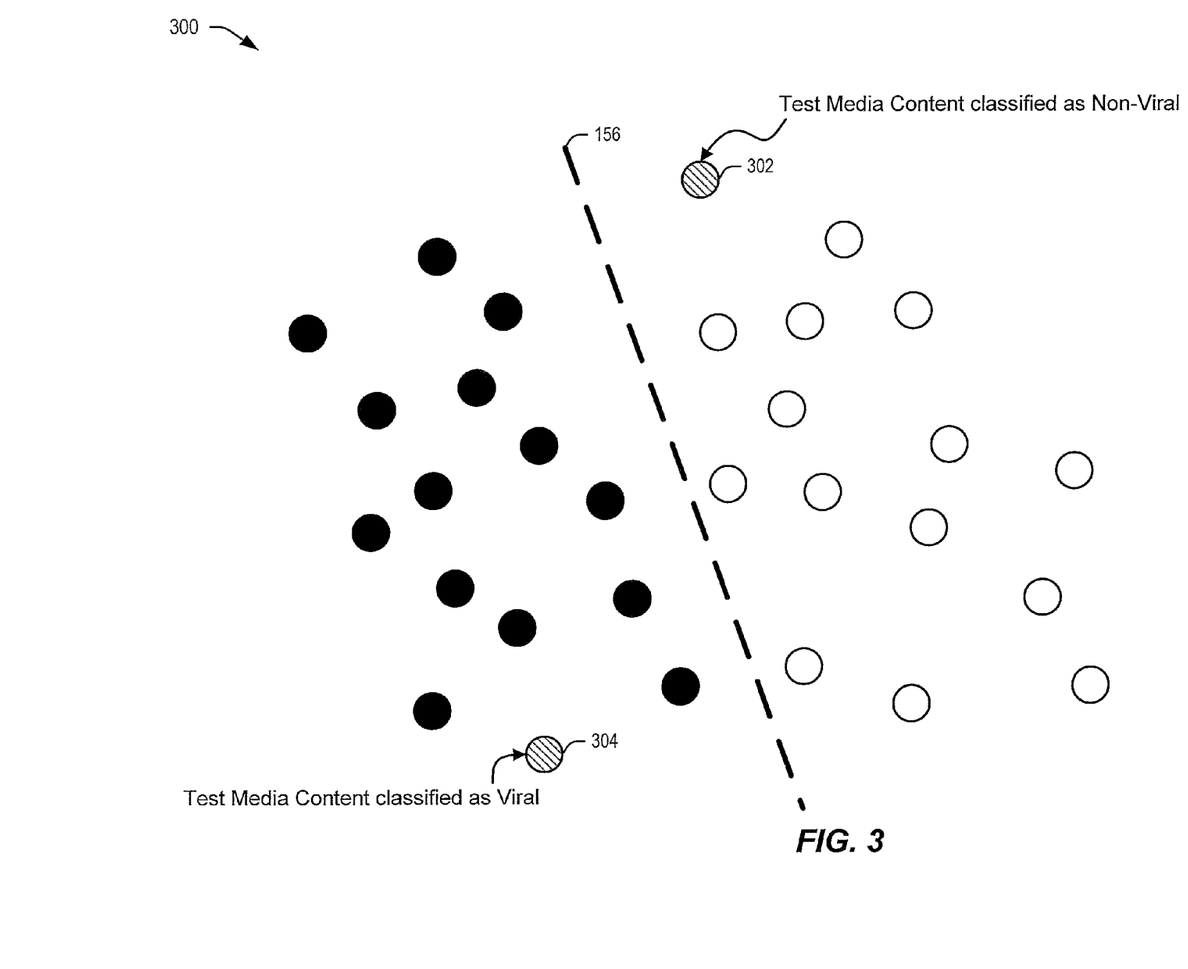
FIG. 3 is a diagram illustrating classifying test media content items based on the boundary condition of FIG. 2.

FIG. 3 illustrates an example of using a decision boundary to classify test media content. For example, a first data point 302 corresponding to a surface (or a tangent space approximation of the surface) corresponding to a test media content item may be located on a non-viral side of the decision boundary 156. Accordingly, the boundary comparator 112 may predict the test media content item as being non-viral. A second data point 304 corresponding to a surface (or a tangent space approximation of the surface) corresponding to a second test media content item may be located on a viral side of the decision boundary 156. Accordingly, the boundary comparator 112 may predict the second test media content item as being viral.

Returning to FIG. 1, the placement determiner 114 may be configured to determine where to store the test media content item data 140 based on the virality indicator 160. For example, the placement determiner 114 may store media content item data that is predicted to go viral at more storage locations than media content item data that is not predicted to go viral. Storing media content item data that may be in high demand at relatively more places may enable faster (e.g., by spreading a workload across multiple storage devices and network components) and more reliable delivery (e.g., by providing redundant sources of the media content item data) of the media content item data to devices. To illustrate, when the virality indicator 160 indicates that the test media content item data 140 is not likely to go viral, the placement determiner 114 may determine that the test media content item data 140 should be stored at the central storage device 122. When the virality indicator 160 indicates that the test media content item data 140 is likely to go viral, the placement determiner 114 may determine that the test media content item data 140 should be stored at one or more of the storage devices 126, 130, 134 in addition or in the alternative to the central storage device 122. Some devices may access the test media content item data 140 via the region 1 network 124 and the region 1 storage device 126 while others access the test media content item data 140 via the region 2 network 128 and the region 2 storage device 130. Spreading requests between the networks 124, 128 and their respective storage devices 126, 130 may increase a speed at which the test media content item data 140 is delivered to devices by decreasing demand at any one network or storage device. Further, if one of the networks 124, 128 or one of the storage devices 126, 130 fails, the test media content item data 140 may still be available to some devices.

In addition, or in the alternative, the placement determiner 114 may store media content item data that is predicted to go viral at storage devices that are relatively closer in a network (e.g., use fewer communication links) to end user devices than other storage devices. The computing device 102 may transmit the media content item data to storage devices based on a decision of the placement determiner 114 or may transmit messages to other devices instructing the other devices to transmit the media content item data to particular storage devices. To illustrate, when the virality indicator 160 indicates that the test media content item data 140 is not likely to go viral, the placement determiner 114 may determine that the test media content item data 140 should be stored at the central storage device 122. When the virality indicator 160 indicates that the test media content item data 140 is likely to go viral, the placement determiner 114 may determine that the test media content item data 140 should be stored at one or more of the storage devices 126, 130, 134 in addition or in the alternative to the central storage device 122. The regional networks 124, 128, 132 may be relatively closer to end user devices than the central network 120. In particular examples, first devices may access the region 1 storage device 126 via the region 1 network 124 without accessing the central network 120. Second devices may access the region 2 storage device 130 via the region 2 network 128 without accessing the central network 120. Third devices may access the region 3 storage device 134 via the region 3 network 132 without accessing the central network 120. By storing the test media content item data 140 at one or more of the regional storage devices 126, 130, 134 the burden of providing highly sought after media content items may be split between one or more of the regional networks 124, 128, 132 without burdening the central network 120.

In particular examples, the placement determiner 114 may determine where to store the test media content item data 140 based further on a subject matter of the test media content item data 140. For example, the test media content item data 140 may have associated metadata that identifies the subject matter (e.g., American football, cricket, a cartoon character, etc.) In addition or in the alternative, the computing device 102 may identify the subject matter based on object recognition techniques. When the virality indicator 160 indicates that the test media content item data 140 is likely to go viral, the placement determiner 114 may determine that the test media content item data 140 should be stored in one or more regional storage devices based on the subject matter. For example, viral media content item data may be stored in storage devices associated with regions where the subject matter is determined to be popular. To illustrate, the placement determiner 114 may determine that a predicted viral video associated with cricket should be stored in a first storage device associated with India (e.g., the region 1 storage device 128) and a second storage device associated with the United Kingdom (e.g., the region 2 storage device 130). The placement determiner 114 may determine that the predicted viral video associated with cricket should not be stored in a regional storage device associated with the United States (e.g., the region 3 storage device 134). After the placement determiner 114 has determined which of the storage devices 122, 126, 130, 134 the test media content item data 140 is to be stored in, the computing device 102 may cause the test media content item data 140 to be sent to those storage devices. The computing device 102 may send the test media content item data 140 to those storage devices or may send messages instructing other devices (e.g., the central storage device 122) to send the test media content item data 140 to those storage devices.

When the virality indicator 160 indicates that the test media content item data 140 is not likely to go viral, the suggestion generator 116 may generate one or more suggested changes to be made to the test media content item data 140 that may increase the chances of the test media content item data 140 going viral. The changes may be output to a display device of the computing device 102 or may be sent to another computing device (e.g., via the central network 120). The suggestion generator 116 may generate the changes based on the viral media content items data 142 and the non-viral media content items data 144. For example, the suggestion generator 116 may determine an average viral surface of viral surfaces included in the viral/non-viral surfaces 150. The average viral surface may correspond to a Karcher mean of the viral surfaces. The suggestion generator 116 may determine an average non-viral surface of viral surfaces included in the viral/non-viral surfaces 150. The average non-viral surface may correspond to a Karcher mean of the non-viral surfaces.

Using the notion of parallel transport, the suggestion generator 116 may determine a function that moves the average non-viral surface to the average viral surface. The suggestion generator 116 may apply the function to the test surface 152 to generate a transformed test surface. The suggestion generator 116 may generate suggested changes based on the transformed test surface. For example, the suggestion generator 116 may generate video frames based on the transformed test surface. In addition or in the alternative, the suggestion generator 116 may identify a viral surface of the viral/surfaces 150 that most closely resembles the transformed test surface. The suggestion generator 116 may generate suggestions that include frames of the viral media content items data 142 corresponding to the identified viral surface. In some examples, the suggested changes may correspond to suggested additions (e.g., particular frames, objects, colors, etc.) and/or deletions (e.g., particular frames, objects, colors, background noise, etc.). Thus, the suggestion generator 116 may make suggestions that may improve the likelihood that the test media content item data 140 will go viral.

Therefore, the computing device 102 may predict whether a particular media content item will go viral (e.g., exceed a popularity threshold within a period of time) based on training data. Based on the prediction the computing device 102 may determine where in a network the particular media content item should be stored. By storing the particular media content item in a relatively more distributed fashion when the particular media content item is predicted to go viral, the computing device 102 may improve an ability of the network to efficiently distribute media content items that quickly become highly requested. Furthermore, the computing device 102 may generate suggested changes that may make a video more popular.

Figure 4:
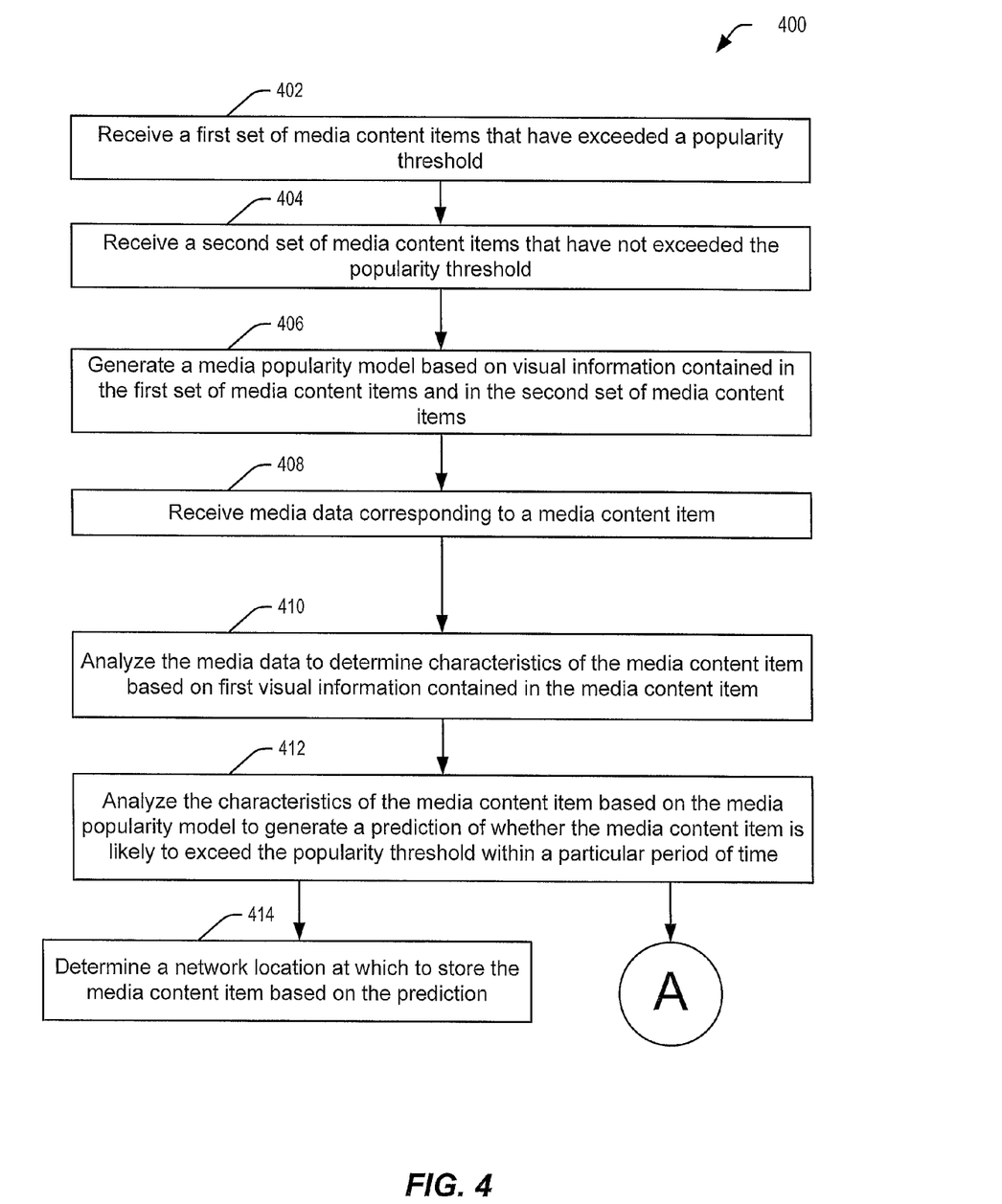
FIG. 4 is a flowchart to illustrate a particular embodiment of a method of predicting content popularity.
Figure 5:
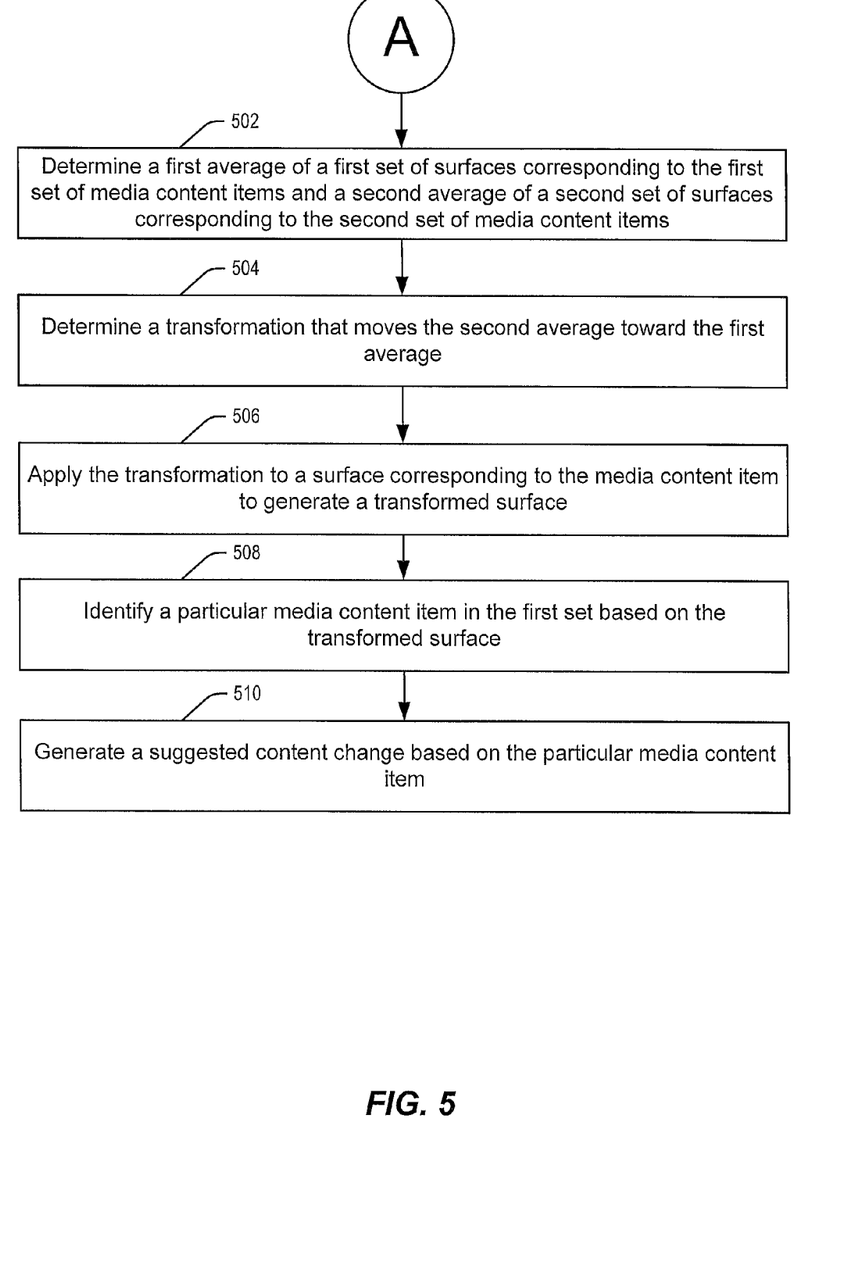
FIG. 5 is a flowchart to illustrate a continuation of the method of FIG. 4.

Referring to FIGS. 4 and 5, a flowchart illustrating a particular embodiment of a method 400 of identifying viral media content items is shown. The method 400 includes receiving a first set of media content items that have exceeded a popularity threshold, at 402. For example, the computing device 102 may receive the viral media content items data 142. The method 400 further includes receiving a second set of media content items that have not exceeded the popularity threshold, at 404. For example, the computing device 102 may receive the non-viral media content items data 144. The method 400 further includes generating a media popularity model based on visual information contained in the first set of media content items and in the second set of media content items, at 406. For example, the visual information extractor 104 may extract the viral/non-viral visual information 146 from the viral media content items data 142 and from the non-viral media content items data 144. The surface generator 106 may generate the viral/non-viral surfaces 150 based on the viral/non-viral visual information 146. The surface analyzer may generate the viral/non-viral surfaces statistics 154, which may include tangent space approximations of the viral/non-viral surfaces 150, and the boundary generator 110 may generate the decision boundary 156 based on the viral/non-viral surfaces statistics.

The method 400 further includes receiving media data corresponding to a media content item, at 408. For example, the computing device 102 may receive the test media content item data 140. The method 400 further includes analyzing the media data to determine characteristics of the media content item based on first visual information contained in the media content item, at 410. For example, the visual information extractor 104 may extract the test visual information 148 from the test media content item data 140. The surface generator 106 may generate the test surface 152 based on the test visual information 148 and the surface analyzer 108 may generate the test surface statistics 158.

The method 400 further includes analyzing the characteristics of the media content item based on a media popularity model to generate a prediction of whether the media content item is likely to exceed a popularity threshold within a particular period of time, at 412. For example, the boundary comparator 112 may compare the test surface 152 or a tangent space projection of the test surface 152 included in the test surface statistics 158 to the decision boundary 156 (e.g., a popularity model) to generate the virality indicator 160. The virality indicator 160 indicates whether the test media content item data 140 is predicted to go viral (e.g., exceed a popularity threshold in a particular period of time).

The method 400 further includes determining a network location at which to store the media content item based on the prediction, at 414. For example, the placement determiner 114 may determine which of the storage devices 122, 126, 130, 134 the test media content item data 140 is to be stored at based on the virality indicator 160.

Alternatively, or in addition, the method 400 includes determining a first average of a first set of surfaces corresponding to the first set of media content items and a second average of a second set of surfaces corresponding to the second set of media content items, at 502. For example, the suggestion generator 116 may determine an average viral surface based on the viral surfaces of the viral/non-viral surfaces 150 and may determine an average non-viral surface based on the non-viral surfaces of the viral/non-viral surfaces 150.

The method 400 further includes determining a transformation that moves the second average toward the first average, at 504. For example, the suggestion generator 116 may determine a parallel transport that moves the average non-viral surface toward the average viral surface.

The method 400 further includes applying the transformation to a surface corresponding to the media content item to generate a transformed surface, at 506. For example, the suggestion generator 116 may apply the parallel transport to the test surface 152 to generate a transformed surface.

The method 400 further includes identifying a particular media content item in the first set based on the transformed surface, at 508. For example, the suggestion generator 116 may identify a particular viral media content item described by the viral media content items data 142 by identifying that a surface of the viral/non-viral surfaces 150 corresponding to the particular viral media content item most closely matches the transformed surface.

The method 400 further includes generating a suggested content change based on the particular media content item, at 510. For example, the suggestion generator 116 may identify an attribute of the particular viral media content item and and/or a frame of the particular viral media content item and output the attribute and/or the frame to a display device.

Thus, the method 400 of FIGS. 4 and 5 may enable prediction of whether a media content item will go viral based on visual information contained in the data of the media content item. The prediction may be used to decide where to store the media content item in a network. Storing the media content item based on predicted virality may increase speed and reliability of the network. In addition or in the alternative, the method 400 may enable generation of suggested content changes that may make the media content item more likely to go viral. It should be noted that the ordering of various operations illustrated in FIGS. 4 and 5 is for example only and is not to be considered limiting. In alternative embodiments, one or more illustrated operations may be reordered, combined, and/or omitted.

Figure 6:
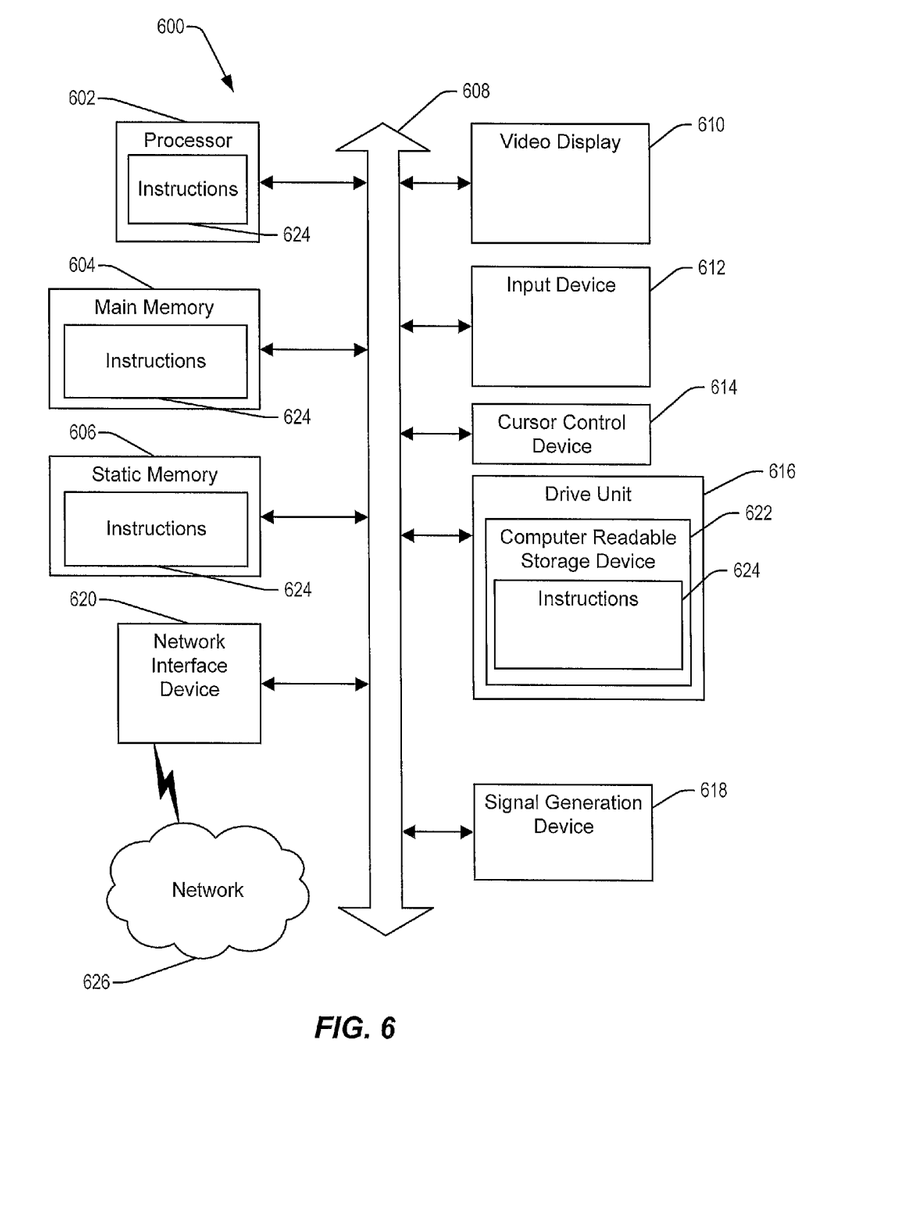
FIG. 6 is a block diagram of an illustrative embodiment of a general computer system operable to support embodiments of computer-implemented methods, computer program products, and system components as illustrated in FIGS. 1-2.

FIG. 6 is a block diagram illustrating an embodiment of a general computer system that is generally designated 600. The computer system 600 may be operable to support embodiments of computer-implemented methods, computer program products, and system components as illustrated in FIGS. 1, 3, and 4. In a particular embodiment, the computer system 600 may correspond to the computing device 102, the central storage device 122, the region 1 storage device 126, the region 2 storage device 130, the region 3 storage device 134, or a combination thereof. The computer system 600 may be coupled to, or in communication with, other computer systems or peripheral devices (e.g., via the central network 120, the region 1 network 124, the region 2 network 128, the region 3 network, or a combination thereof).

The computer system 600 may be implemented as or incorporated into various devices, such as a tablet computer, a personal digital assistant (PDA), a palmtop computer, a laptop computer, a smart phone, a communications device, a web appliance, a display device, a computing device, or any other machine capable of executing a set of instructions (sequential or otherwise) that specify actions to be taken by that machine. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU). In a particular embodiment, the processor 602 may correspond to, or include or execute instructions associated with, the visual information extractor 104, the surface generator 106, the surface analyzer 108, the boundary generator 110, the boundary comparator 112, the placement determiner 114, the suggestion generator 116, or a combination thereof. In a particular embodiment, the processor 602 may include multiple processors. For example, the processor 602 may include distributed processors, parallel processors, or both. The multiple processors may be included in, or coupled to, a single device or multiple devices. The processor 602 may include a virtual processor. In a particular embodiment, the processor 602 may include a state machine, an application specific integrated circuit (ASIC), or a programmable gate array (PGA) (e.g., a field PGA).

Moreover, the computer system 600 may include a main memory and a static memory 606 that may communicate with each other via a bus 608. The main memory 604, the static memory 606, or both, may include instructions 624. The instructions 624, when executed by the processor 602, may cause the processor 602 to perform operations. The operations may include the functionality of the visual information extractor 104, the surface generator 106, the surface analyzer 108, the boundary generator 110, the boundary comparator 112, the placement determiner 114, the suggestion generator 116, the steps of the method 400, or a combination thereof. As shown, the computer system 600 may further include or be coupled to a display unit 610, such as a liquid crystal display (LCD), an organic light emitting diode (OLED), a flat panel display, a solid-state display, or a projection display. Additionally, the computer system 600 may include an input device 612, such as a keyboard, a remote control device, and a cursor control device 614, such as a mouse. In a particular embodiment, the cursor control device 614 may be incorporated into the remote control device. The computer system 600 may also include a disk drive unit 616, a signal generation device 618, such as a speaker, and a network interface device 620. The network interface device 620 may be coupled to other devices (not shown) via a network 626. The network 626 may correspond to the central network 120. For example, the network interface device 620 may be coupled to the computing device 102. In a particular embodiment, one or more of the components of the computer system 600 may correspond to, or be included in, the computing device 102.

In a particular embodiment, as depicted in FIG. 6, the disk drive unit 616 may include a tangible computer-readable storage device 622 in which the instructions 624, e.g. software, may be embedded. Further, the instructions 624 may embody one or more of the methods or logic as described herein. In a particular embodiment, the instructions 624 may reside completely, or at least partially, within the memory 604, the static memory 606, and/or within the processor 602 during execution by the computer system 600. The processor 602 may execute the instructions 624 to perform operations corresponding to one or more of the methods or logic as described herein. The processor 602 may perform the operations directly, or the processor 602 may facilitate, direct, or cooperate with another device or component to perform the operations.

In an alternative embodiment, dedicated hardware implementations, such as application specific integrated circuits, programmable logic arrays and other hardware devices, can be constructed to implement one or more of the operations or methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable storage device that includes the instructions 624 to enable prediction of whether a media content item will exceed a popularity threshold within a particular period of time based on visual information contained in the media content item. Further, the instructions 624 may be transmitted or received over the network 626 via the network interface device 620 (e.g., via uploading and/or downloading of a viral video detection application or program, or both).

While the computer-readable storage device is shown to be a single device, the term "computer-readable storage device" includes a single device or multiple devices, such as centralized or distributed storage, and/or associated caches that store one or more sets of instructions. The term "computer-readable storage device" shall also include any device that is capable of storing a set of instructions for execution by a processor or that causes a computer system to perform any one or more of the methods or operations disclosed herein.

In a particular non-limiting, exemplary embodiment, the computer-readable storage device can include a solid-state memory such as a memory card or other package that houses one or more non-volatile read-only memories. Further, the computer-readable storage device can be a random access memory or other volatile re-writable memory. Additionally, the computer-readable storage device can include a magneto-optical or optical medium, such as a disk or tapes. A computer-readable storage device is an article of manufacture and is not a signal.

It should also be noted that software that implements the disclosed operations may be stored on a storage device, such as: a disk or tape; a magneto-optical or optical device, such as a disk; or a solid state device, such as a memory card or other package that houses one or more read-only (non-volatile) memories, random access memories, or other re-writable (volatile) memories.

Although the present specification describes components and functions that may be implemented in particular embodiments with reference to particular standards and protocols, the claims are not limited to such standards and protocols. For example, standards for Internet, other packet switched network transmission and standards for viewing media content represent examples of the state of the art. Such standards are periodically superseded by faster or more efficient equivalents having essentially the same functions. Accordingly, replacement standards and protocols having the same or similar functions as those disclosed herein are considered equivalents thereof.

Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. As the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a computing device, media data corresponding to a media content item;
   analyzing, at the computing device, the media data to determine characteristics of the media content item based on first visual information contained in the media content item;
   analyzing, at the computing device, the characteristics of the media content item based on a media popularity model to generate a prediction of whether the media content item is likely to exceed a popularity threshold within a particular period of time; and
   initiating storage of the media content item at a network location selected from a plurality of network locations based on the prediction.

2. The method of claim 1, wherein the media popularity model includes a boundary condition determined based on:
   a first set of surfaces generated based on second visual information contained in a first set of media content items that have exceeded the popularity threshold; and
   a second set of surfaces generated based on third visual information contained in a second set of media content items that have not exceeded the popularity threshold.

3. The method of claim 2, wherein the surfaces of the first set of surfaces correspond to curves or surfaces in a multi-dimensional space with axes corresponding to particular visual information characteristics of the second visual information, and wherein the surfaces of the second set of surfaces correspond to curves or surfaces in the multidimensional space.

4. The method of claim 2, wherein determining whether media content item is likely to exceed the popularity threshold comprises comparing a particular surface to the boundary condition, the particular surface generated based on the first visual information.

5. The method of claim 1, wherein the first visual information corresponds to spatio-temporal features of the media content item.

6. The method of claim 5, wherein the characteristics correspond to pixel characteristics, detected edges, detected objects, detected features, detected blobs, other detected visual characteristics, or a combination thereof of the media content item, and wherein the spatio-temporal features correspond to the characteristics measured during a time period.

7. The method of claim 1, further comprising generating a suggested content change to the media content item in response to determining that the media content item is not likely to exceed the popularity threshold.

8. The method of claim 7, wherein generating the suggested content change comprises:
determining a first average of the a first set of surfaces generated based on second visual information included in a first set of media content items that have exceeded the popularity threshold;
determining a second average of a second set of surfaces generated based on third visual information included in a second set of media content items that have not exceeded the popularity threshold;
determining a transformation that moves the second average toward the first average;
applying the transformation to the a particular surface to generate a transformed surface, the particular surface generated based on the first visual information; and
generating the suggested content change based on content of a particular media content item selected from the first set of media content items based on the transformed surface.

9. The method of claim 8, wherein the first average corresponds to a first Karcher mean of the first set of surfaces, and wherein the second average corresponds to a second Karcher mean of the second set of surfaces.

10. The method of claim 1, wherein initiating storage of the media content item at the network location includes transmitting the media content item from the computing device to the network location, and wherein each of the plurality of network locations is associated with a different geographic location and the network location is selected based further on subject matter of the content media item being determined to be popular in a geographic location associated with the network location.

11. The method of claim 1, wherein the visual information includes a bag-of-visual words, a histogram of oriented gradients/optical flow, features detected using extended speeded up robust features (SURF), objects depicted in the media content item, features detected using other image processing techniques, or a combination thereof, corresponding to one or more frames of the media content item.

12. A computer-readable storage device storing instructions that, when executed by a processor, cause the processor to perform operations comprising:
receiving media data corresponding to a media content item;
analyzing the media data to determine characteristics of the media content item based on first visual information contained in the media content item;
analyzing the characteristics of the media content item based on a media popularity model to generate a prediction of whether the media content item is likely to exceed a popularity threshold within a particular period of time; and
initiating storage of the media content item at a network location selected from a plurality of network locations based on the prediction.

13. The computer-readable storage device of claim 12, wherein the first visual information corresponds to spatio-temporal features of the media content item.

14. The computer-readable storage device of claim 12, wherein the media popularity model comprises a boundary condition determined based on:
a first set of surfaces generated based on second visual information contained in a first set of media content items that have exceeded the popularity threshold; and
a second set of surfaces generated based on third visual information contained in a second set of media content items that have not exceeded the popularity threshold.

15. The computer-readable storage device of claim 14, wherein the first set of surfaces corresponds to curves or surfaces in a multidimensional space with axes corresponding to particular visual information characteristics of the second visual information, and wherein the second set of surfaces corresponds to curves or surfaces in the multidimensional space.

16. The computer-readable storage device of claim 12, wherein initiating storage of the media content item at the network location includes transmitting a message to a device instructing the device to transmit the media content item to the network location.

17. An apparatus comprising:
a processor; and
a memory configured to store instructions that, when executed by the processor, cause the processor to perform operations comprising:
receiving media data corresponding to a media content item;
generating a prediction of whether the media content item is likely to exceed a popularity threshold within a particular period of time, the prediction generated based on a comparison of characteristics of the media content item to a media popularity model, the characteristics identified based on visual information included in the media content item; and
initiating storage of the media content item at a network location selected from a plurality of network locations based on the prediction.

18. The apparatus of claim 17, wherein the first visual information corresponds to spatio-temporal features of the media content item.

19. The apparatus of claim 17, wherein the media popularity model comprises a boundary condition determined based on:
a first set of surfaces generated based on second visual information contained in a first set of media content items that have exceeded the popularity threshold;
a second set of surfaces generated based on third visual information contained in a second set of media content items that have not exceeded the popularity threshold.

20. The apparatus of claim 19, wherein the first set of surfaces corresponds to curves or surfaces in a multidimensional space with axes corresponding to particular visual information characteristics of the second visual information, and wherein the second set of surfaces corresponds to curves or surfaces in the multidimensional space.

* * * * *